United States Patent [19]

Coutandin et al.

[11] Patent Number: 5,073,314

[45] Date of Patent: Dec. 17, 1991

[54] METHOD AND APPARATUS FOR PRODUCING A STAR COUPLER FROM POLYMER OPTICAL WAVEGUIDES

[75] Inventors: Jochen Coutandin, Langenlonsheim; Werner Groh, Lich; Peter Herbrechtsmeier, Königstein/Taunus; Jürgen Theis, Frankfurt am Main, all of Fed. Rep. of Germany

[73] Assignee: Hoechst Aktiengesellschaft, Frankfurt am Main, Fed. Rep. of Germany

[21] Appl. No.: 535,825

[22] Filed: Jun. 11, 1990

[30] Foreign Application Priority Data

Jun. 13, 1989 [DE] Fed. Rep. of Germany ....... 3919263

[51] Int. Cl.$^5$ ............................................. B29D 11/00
[52] U.S. Cl. ...................................... 264/1.5; 264/2.7; 264/248; 425/108; 425/408; 425/508; 425/520; 425/521
[58] Field of Search ......................... 264/1.5, 2.7, 248; 156/296; 425/808, 108, 408, 508, 520, 521

[56] References Cited

U.S. PATENT DOCUMENTS

| | | | |
|---|---|---|---|
| 3,819,442 | 6/1974 | Brushenko | 156/296 |
| 4,372,769 | 2/1983 | Hicks, Jr. | 264/1.5 |
| 4,514,057 | 4/1985 | Palmer et al. | 264/1.5 |
| 4,738,511 | 4/1988 | Fling | 264/1.5 |

Primary Examiner—James Lowe

[57] ABSTRACT

Mechanically robust star couplers of polymer optical waveguides having low insertion losses and small fluctuations between the individual output fibers are obtained if polymer optical waveguides are arranged in parallel in the middle region of an apparatus and fused with one another under pressure and with the supply of heat. The optical cladding of the polymer optical waveguides has been previously removed. The method is easy and cost-effective. The apparatus is composed of a lower part with a channel recessed therein and an upper part with a male die located therein, which male die corresponds in its shape to the shape of the channel.

3 Claims, 3 Drawing Sheets

METHOD AND APPARATUS FOR PRODUCING A STAR COUPLER FROM POLYMER OPTICAL WAVEGUIDES

BACKGROUND OF THE INVENTION

The invention relates to a method of producing a mechanically robust star coupler for polymer optical waveguide systems and the apparatus used for it.

A star coupler is an optical component which splits the optical guide in an input fiber into M output fibers. Such components are used in passive optical waveguide networks as optical power splitters. The uniform splitting takes place in the so-called mixed region. Until now, essentially there have been 2 methods of producing star couplers for polymer optical waveguide systems:

1. "Biconical-Taper method" (BT method; cf. K. Imoto et al., Appl. Opt., vol. 25, No. 19, p. 3443 (1986)
2. "Mixing rod method" (MR method; cf. R. D. Codd, SAE/IEEE, International Congress on Transportation Electronics (1984))

In the case of the BT method, a plurality of optical waveguides (glass or polymer) are clustered and stretched under the effect of heat. In the process, a waist having a biconical profile is produced, from which the name of the method derives. Subsequently, the stretched fibers are twisted in the hot zone, so that the optical claddings of the optical waveguides are fused with one another in the waist.

The propagation angles of light rays which are guided in an input fiber become increasingly steep in the tapering region, until the core no longer guides these rays. Beginning with the modes of highest order, core modes increasingly become cladding modes. In the fusion region, the cladding modes of the various fibers mix with one another. When the fibers subsequently separate again, the light rays guided in the cladding are distributed over all of the output fibers and, with increasing fiber thickness, are continuously converted back into core modes.

Star couplers produced by this method are relatively low-loss, but exhibit a strong mode dependence, which in the case of a system structure composed of optical wave-guides, demountable connections and coupler, is taken into account by assuming an overdimensional system reserve.

A further disadvantage of a BT coupler is its mechanical instability in the tapering region, so that use for example in an automobile would not be possible. In addition, production is complex and expensive, since the method only allows one-off production with all the resultant disadvantages, such as for example the inability to reproduce optical parameters.

In the case of the MR method, polymer optical waveguides are adhesively fixed by their polished ends to the end faces of transparent rods or chips. The chips or rods in this case serve as optical mixers.

This method is very complex and expensive in production and therefore not suitable for series production. The optical losses are high.

OBJECTS OF THE INVENTION

The object was to find a method by which a mechanically robust star coupler can be produced easily and cost-effectively. The method should also provide couplers having low insertion losses and small fluctuations between the individual output fibers.

SUMMARY OF THE INVENTION

It has been found that the requirements mentioned above can be met if polymer optical waveguides are fused with one another in an apparatus under pressure and with the supply of heat.

For the method, 2 to $10^3$, preferably 2 to 128, polymer optical waveguides, the optical cladding of which has previously been removed in the region to be fused in order to permit the light transfer between the individual fibers, are laid in a channel in the lower part of an apparatus. The inside walls of said apparatus are expediently polished in order to reduce surplus roughnesses, which can result in strong optical losses.

At a temperature distinctly above the glass transition temperature of the optical waveguide material, a male die is used to fuse the optical waveguides under pressure into a homogeneous mixed region. Thereafter, lower part and male die are cooled to below the glass transition temperature, while maintaining the pressure, and the coupler is removed from the channel. The opening of the channel is conically shaped, so that during pressing the transition from the mixed region to the individual fibers runs continuously, since an abrupt cross sectional changeover results in a relatively pronounced kink in the fibers, which entails high optical losses.

The mixed region, which is composed of stripped polymer optical waveguides, is optically insulated by a material of which the refractive index must be lower than that of the optical waveguide material. This optical insulation may be carried out after the fusing by a transparent lacquer.

A mechanically more stable coupler is obtained by not fusing the optical waveguides directly, but for example introducing them into a transparent thermoplastically processable plastic tube of low refractive index, and fusing this complete system in the previously described apparatus under pressure and with heat.

Instead of a tube, a plastic part with rectangular opening may be used, which has the advantage that polymer optical waveguides can be laid in an arrangement in individual layers. The tube or the rectangular shape form the optical cladding for the mixed region and serve at the same time as mechanical reinforcement for the fused region. The geometrical dimensions of the apparatus and of the male die depend on how many optical waveguides are to be fused.

Optical waveguides of which the optical cladding has been mechanically or chemically removed in the region to be fused are used.

Suitable polymer optical waveguides have a diameter of 0.1 to 3, preferably 0.5 to 1 mm, and a core of, for example, PMMA (core refractive index $n_K=1.49$), PS ($n_K=1.59$) or PC ($n_K=1.585$).

A star coupler produced in this way proves to be mechanically extremely robust with good optical transmission properties.

The following detailed description, given by way of example but not intended to limit the invention solely to the specific embodiments described, may best be understood in conjunction with the accompanying drawings in which.

DETAILED DESCRIPTION OF THE PREFERRED EMBODIMENTS

Figure 1:
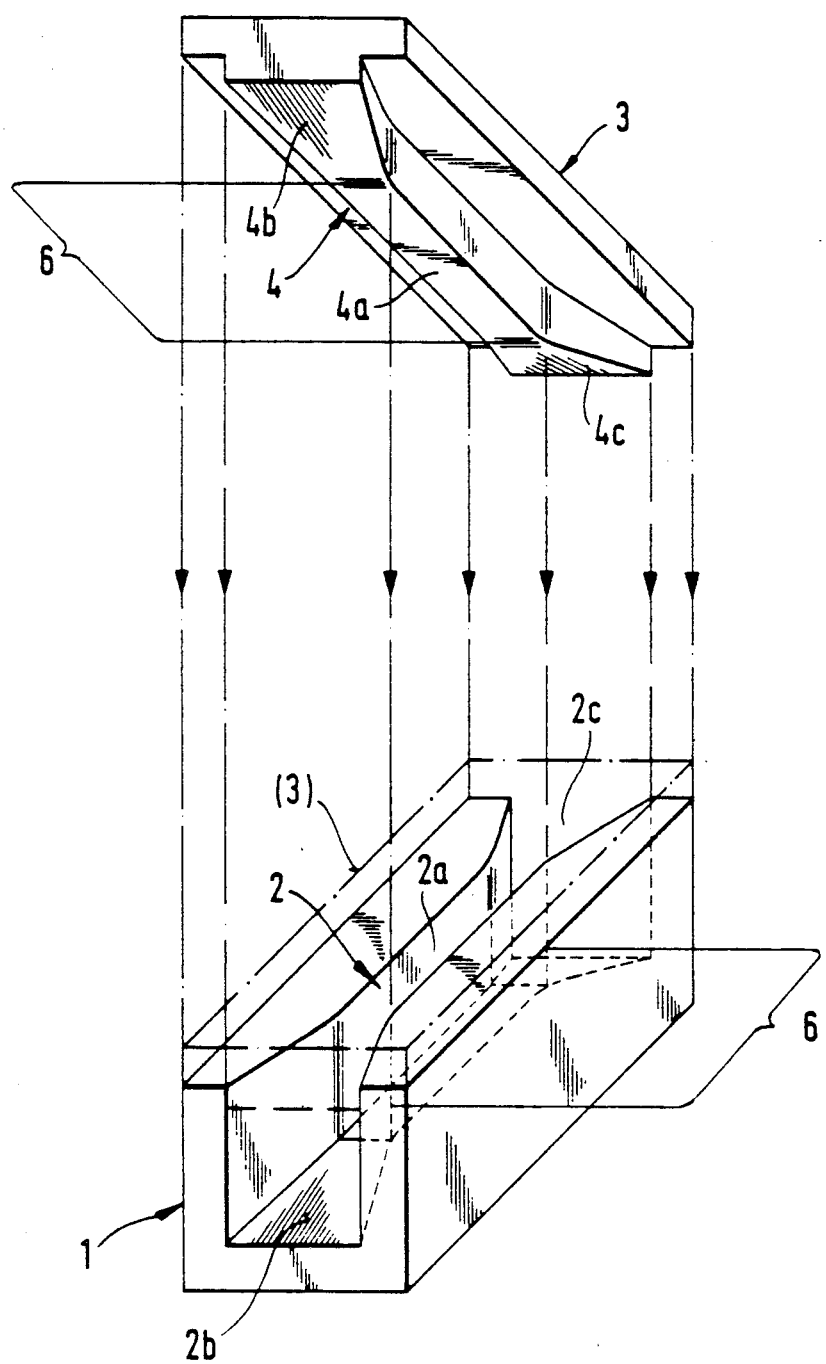
FIG. 1 is an exploded perspective view of an embodiment of an apparatus in accordance with the present invention for producing a star coupler having a rectangular cross-section in the mixing region.

The figures show, seen in perspective, partially from above, partially from below, design possibilities for the apparatus for producing star couplers. FIG. 1 shows an apparatus for producing a star coupler of rectangular cross section in the mixed region (6). A channel (2) of rectangular cross section, which consists of a prismatic middle section (2a) and two frustopyramidal side sections (2b) and (2c), is recessed into the lower part (1). The upper part (3) is provided with a male die (4), which corresponds in its shape to the channel (2) in the lower part (1) and is made up of a prismatic middle section (4a) and two frustopyramidal side sections (4b) and (4c).

Figure 2:
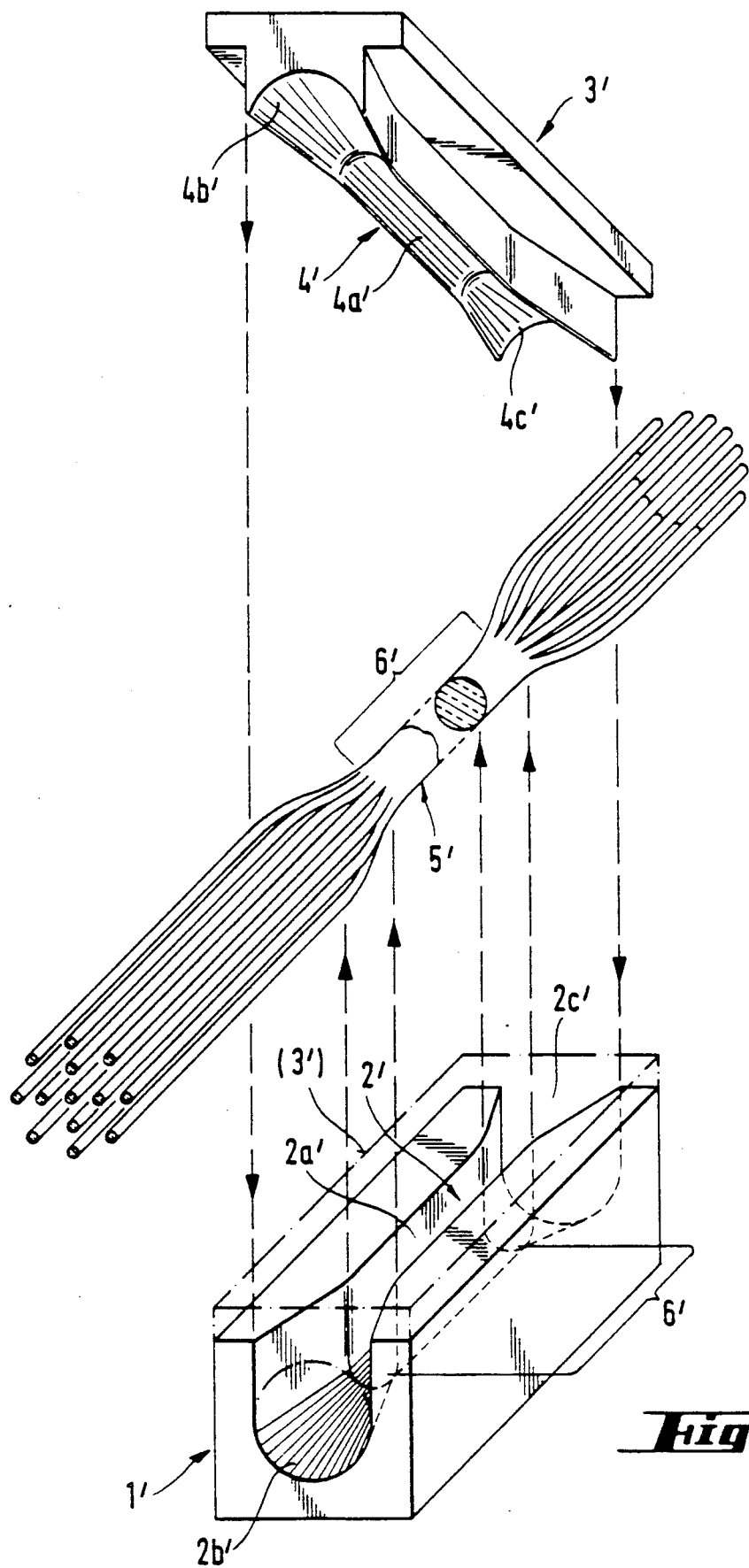
FIG. 2 is an exploded perspective view of another embodiment of an apparatus in accordance with the present invention for producing a star coupler having a cross-section, which is generally conically formed at the side edges thereof.

Instead of the rectangular cross section, according to FIG. 2 the channel (2') may also have a cross section which is rounded out on one side, so that, in conjunction with the male die (4'), which is likewise rounded out on the underside, a round cross section of the finished star coupler (5') is produced. The apparatus consists completely of metal.

Figure 3:
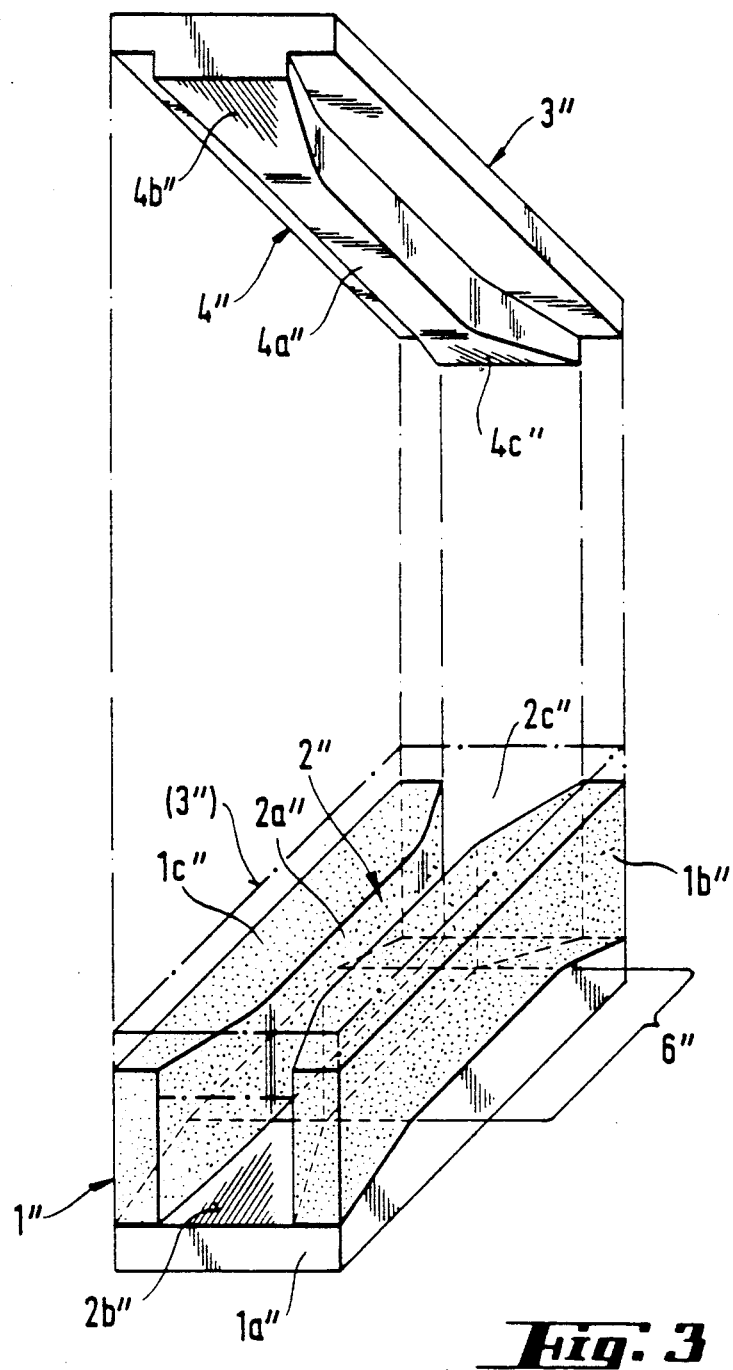
FIG. 3 is an exploded perspective view, similar to FIG. 1, of an apparatus in accordance with the present invention for producing a star coupler wherein the bottom plate and the upper part form electrodes in order to facilitate heating of the apparatus.

FIG. 3 shows another possibility of designing the apparatus, which in particular facilitates the heating of the apparatus. The lower part (1") is not composed of one piece, but of a bottom plate (1a") of metal and two side plates (1b") and (1c") of an electrically insulating, heat-resistant material, for example glass or ceramic. Bottom plate (1a") and upper part (3") with male die (4") form the electrodes to a capacitor, to which an alternating voltage can be applied. The high-frequency electric alternating field acting between the electrodes excites the molecular dipoles to perform oscillations synchronous with the alternating field (for example 27.12 MHz). This produces a molecular friction, which heats the polymers from inside outward. While this is happening, the mold remains cold, since a time of less than 10 s is required for the entire process. The weld-pressed plastic can be removed immediately after opening the apparatus.

EXAMPLE 1

Production of a 9×9 Star Coupler

Nine 50 cm long plastic optical waveguides of polycarbonate having a diameter of 1 mm were laid in threes next to one another in a PMMA shape with rectangular opening.

The optical cladding was previously removed chemically in the middle of the fiber over a distance of 5 cm. The system of PMMA shape plus PC fibers was then laid in a metal mold according to FIG. 1 and heated to 170° C. by means of an electric resistance heating. At the same time, the male die was used to exert a pressure of 10 kg/cm$^2$ and thereby to fuse the 9 fibers into a mixed region. The PMMA shape served as an optical cladding, at which the light rays are totally reflected, and at the same time it acts as a solid protective cover for the mixed region.

After about 5 minutes, the heating was switched off, the pressure continuing to be maintained. After a further 10 minutes, the system had cooled down to below 100° C., the glass transition temperature of the PMMA shape. The pressure was taken away and the star coupler removed from the metal mold.

The star coupler had an average insertion loss of 13.2 dB with a maximum power fluctuation between the output fibers of 2.6 dB.

EXAMPLE 2

Production of an 8×8 Star Coupler

Eight 50 cm long polymer optical waveguides of PMMA having a diameter of 1 mm were laid in fours next to one another in a mold, the underside of which formed a plate of a capacitor. The side walls of the mold were composed of glass platelets.

A metal male die formed the upper plate of the capacitor. The optical cladding of the PMMA fibers was previously removed chemically in the middle of the fiber over a distance of 5 cm.

Subsequently, a male die was used to exert a pressure of about 15 kg/cm$^2$ on the fibers, and the applied high-frequency electric alternating field effected a heat development in the PMMA fibers within 5 s, so that the optical waveguides fused under the pressure into a homogeneous mixed rod. The pressing mold remained cold during this, and the coupler could be removed directly after opening the mold.

The entire process lasted about 20 seconds. Subsequently, the mixed region of the 8×8 star coupler was coated with a polysiloxane hard lacquer. At n=1.43, the refractive index of the lacquer is lower than that of the fiber material at n=1.49. The lacquer layer consequently acts as a totally reflecting optical cladding. The insertion loss of the 8×8 star coupler was 12 dB with a maximum power fluctuation between the output fibers of 2.3 dB.

What is claimed is:

1. A method of producing a star coupler from polymer optical waveguides by simultaneous ordering and clustering of the optical waveguides and bonding of the same in an apparatus having a male die and a lower part with a channel, wherein the optical waveguides freed of cladding at the bonding point are laid in parallel in the channel in the middle region of the lower part of the apparatus, which channel corresponds to the later shape of the star coupler, wherein the optical waveguides are fused by heat and pressure by pressing of the male die into the lower part of the apparatus.

2. An apparatus for producing a star coupler from polymer optical waveguides, comprising a lower part with a channel located therein, said channel is comprised of a parallel middle section and two conical side sections, and an upper part with a male die, which corresponds in its shape to the channel and is comprised of a parallel middle section and two conical side sections.

3. The apparatus as claimed in claim 2, wherein the lower part is composed of a bottom plate of metal and two side walls and of electrically non-conducting heat-resistant material wherein said upper part with a male die can be pressed into the channel in the in the lower part, and the channel corresponds to the shape of the star coupler,

* * * * *